US012233810B2

(12) United States Patent
Mashiko et al.

(10) Patent No.: US 12,233,810 B2
(45) Date of Patent: Feb. 25, 2025

(54) OCCUPANT PROTECTION DEVICE

(71) Applicant: SUBARU CORPORATION, Tokyo (JP)

(72) Inventors: Koichi Mashiko, Tokyo (JP); Takehiro Kurihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/514,750

(22) Filed: Nov. 20, 2023

(65) Prior Publication Data

US 2024/0190378 A1 Jun. 13, 2024

(30) Foreign Application Priority Data

Dec. 13, 2022 (JP) ................................. 2022-198410

(51) Int. Cl.
*B60R 21/233* (2006.01)
*B60R 21/232* (2011.01)
*B60R 21/2334* (2011.01)

(52) U.S. Cl.
CPC .......... *B60R 21/233* (2013.01); *B60R 21/232* (2013.01); *B60R 21/2334* (2013.01)

(58) Field of Classification Search
CPC ....................... B60R 21/2334; B60R 21/23138
See application file for complete search history.

(56) References Cited

U.S. PATENT DOCUMENTS

| 7,631,891 | B2 * | 12/2009 | Washino | ............... B60R 21/203 |
| | | | | 280/731 |
| 9,566,937 | B1 * | 2/2017 | Anderson | ............. B60R 21/235 |
| 10,730,472 | B2 * | 8/2020 | Perez | ..................... B60R 21/233 |
| 10,814,822 | B2 * | 10/2020 | Kanegae | ............. B60R 21/233 |
| 11,407,373 | B2 * | 8/2022 | Kanegae | ............. B60R 21/2338 |
| 11,731,576 | B2 * | 8/2023 | Fuma | ..................... B60R 21/207 |
| | | | | 280/729 |
| 12,030,454 | B2 * | 7/2024 | Nakashima | ........... B60R 21/203 |
| 2010/0201107 | A1 | 8/2010 | Abe et al. | |

(Continued)

FOREIGN PATENT DOCUMENTS

| CN | 110614973 A | * 12/2019 | ............... B60N 2/04 |
| CN | 110329197 B | * 2/2023 | ............. B60R 21/20 |

(Continued)

*Primary Examiner* — Nicole T Verley (74) *Attorney, Agent, or Firm* — MCGINN I.P. LAW GROUP, PLLC (57) ABSTRACT

An occupant protection device for a vehicle includes a first bag that deploys in front of a vehicle's occupant, a second bag that deploys adjacent to the first bag, and a deployment controller that selects, according to a collision mode, a first deployment mode in which the first bag deploys and the second bag does not deploy and a second deployment mode in which both bags deploy. The first bag includes a first air chamber, a second air chamber that extends from the first air chamber toward the second bag, and a communication flow path that supplies deployment gas from the first air chamber to the second air chamber. The communication flow path includes a supply restriction unit that restricts supply of the deployment gas from the first air chamber to the second air chamber in response to interference between the second air chamber and the second bag.

13 Claims, 5 Drawing Sheets

(56) References Cited

U.S. PATENT DOCUMENTS

| | | | | |
|---|---|---|---|---|
| 2015/0343986 A1* | 12/2015 | Schneider | ............ | B60R 21/205 |
| | | | | 280/729 |
| 2016/0297392 A1* | 10/2016 | Schneider | ............ | B60R 21/231 |
| 2018/0251096 A1* | 9/2018 | Fischer | ................ | B60R 21/233 |
| 2019/0381968 A1* | 12/2019 | Kwon | .................. | B60R 21/214 |
| 2020/0122665 A1* | 4/2020 | Shin | ................ | B60R 21/01554 |
| 2021/0070243 A1* | 3/2021 | Kanegae | .............. | B60R 21/231 |
| 2023/0256929 A1* | 8/2023 | Nagasawa | .............. | B60R 21/21 |
| | | | | 280/729 |
| 2024/0190378 A1* | 6/2024 | Mashiko | ............ | B60R 21/2334 |

FOREIGN PATENT DOCUMENTS

| | | | | |
|---|---|---|---|---|
| CN | 220332633 U * | 1/2024 | | |
| EP | 3640095 A1 * | 4/2020 | ....... | B60R 21/01512 |
| GB | 2550059 A * | 11/2017 | ......... | B60R 21/0132 |
| JP | 2007-1362 A | 1/2007 | | |
| JP | 2008-308139 A | 12/2008 | | |
| JP | 5366591 B2 * | 12/2013 | | |
| JP | 2018079709 A * | 5/2018 | | |
| JP | 6709148 B2 * | 6/2020 | | |
| JP | 2020196383 A * | 12/2020 | ........... | B60R 21/013 |
| RU | 2017112691 A * | 10/2018 | ......... | B60R 21/0132 |
| WO | WO-2007069064 A2 * | 6/2007 | ........... | B60R 21/233 |
| WO | WO-2016085168 A1 * | 6/2016 | ........... | B60R 21/203 |

\* cited by examiner

VEHICLE FRONT ↑   OUTSIDE IN VEHICLE WIDTH DIRECTION →

FIG. 6

VEHICLE FRONT ↑   OUTSIDE IN VEHICLE WIDTH DIRECTION →

OCCUPANT PROTECTION DEVICE

CROSS-REFERENCE TO RELATED APPLICATIONS

The present application claims priority from Japanese Patent Application No. 2022-198410 filed on Dec. 13, 2022, the entire contents of which are hereby incorporated by reference.

BACKGROUND

The present disclosure relates to an occupant protection device provided in a vehicle.

As a technology related to an airbag device that is provided in a vehicle such as an automobile and restrains an occupant in the event of a collision, for example, Japanese Unexamined Patent Application Publication No. 2007-1362 describes a technology in which an airbag is partitioned into an upper air chamber and a lower air chamber by a partition wall, an inflator is provided on the lower air chamber side, a pressure regulating valve having a thin film portion is provided on the partition wall, and the thin film portion is ruptured when the pressure in the lower air chamber reaches a set value, so that the lower air chamber and the upper air chamber communicate with each other, in order to be appropriately deployable according to the occupant's physique and seating posture.

In order to reduce a pressure loss during inflation and deployment of an airbag and to efficiently exert an impact absorbing force according to a body type of an occupant, Japanese Unexamined Patent Application Publication No. 2008-308139 describes an airbag including a convex portion forming a portion protruding to the outside in a part of the airbag, a vent hole formed in the convex portion, a strap having one end coupled to the convex portion and the other end coupled to the inside of the airbag, and an insertion hole for guiding the other end of the strap to the inside of the airbag 2, in which the vent hole is disposed in a region where the convex portion and the airbag overlap when the convex portion is pulled by the strap.

SUMMARY

An aspect of the disclosure provides an occupant protection device for a vehicle. The occupant protection device includes a first air bag, a second air bag, and a deployment controller. The first bag is configured to deploy in front of an occupant of the vehicle. The second bag is configured to deploy adjacent to the first bag. The deployment controller is configured to select, according to a collision mode, a first deployment mode in which the first bag deploys and the second bag does not deploy and a second deployment mode in which the first bag and the second bag deploy. The first bag includes a first air chamber, a second air chamber, and a communication flow path. The second air chamber extends from the first air chamber toward the second bag. The communication flow path is configured to supply deployment gas from the first air chamber to the second air chamber. The communication flow path includes a supply restriction unit. The supply restriction unit is configured to restrict supply of the deployment gas from the first air chamber to the second air chamber in response to interference between the second air chamber and the second bag.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

For example, in a case of a collision mode in which a lateral behavior occurs in the vehicle body, such as an offset collision or an oblique frontal collision (oblique collision), there is a possibility that the occupant is displaced from the airbag deployed on the front side of the occupant and collides with the airbag, and thus, for example, in an airbag in a passenger seat airbag or the like, it has been proposed to provide protrusions (side support portions) that sandwich the head or the upper body of the occupant from the left and right so that the occupant is not displaced.

On the other hand, in the collision mode in which a lateral behavior occurs in the vehicle body, the head of the occupant can be effectively protected by deploying a curtain airbag in a region adjacent to the cabin side surface portion.

However, when a frontal collision airbag and a curtain airbag or the like deployed around the frontal collision airbag interfere with each other at the time of deployment, deformation and positional displacement of each airbag occur, and there is a concern that occupant protection performance is deteriorated.

In view of the above-described problems, it is desirable to provide an occupant protection device in which interference between bags is suppressed and occupant protection performance is improved.

Hereinafter, an embodiment of an occupant protection device to which the disclosure is applied will be described. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

An occupant protection device according to the embodiment is an airbag device provided in a cabin of an automobile such as a passenger car, for example.

Note that each bag is actually deployed not by air but by a deployment gas generated by a chemical (gunpowder) inflator (gas generator), but will be hereinafter described as an "airbag" which is a general name.

Figure 1:
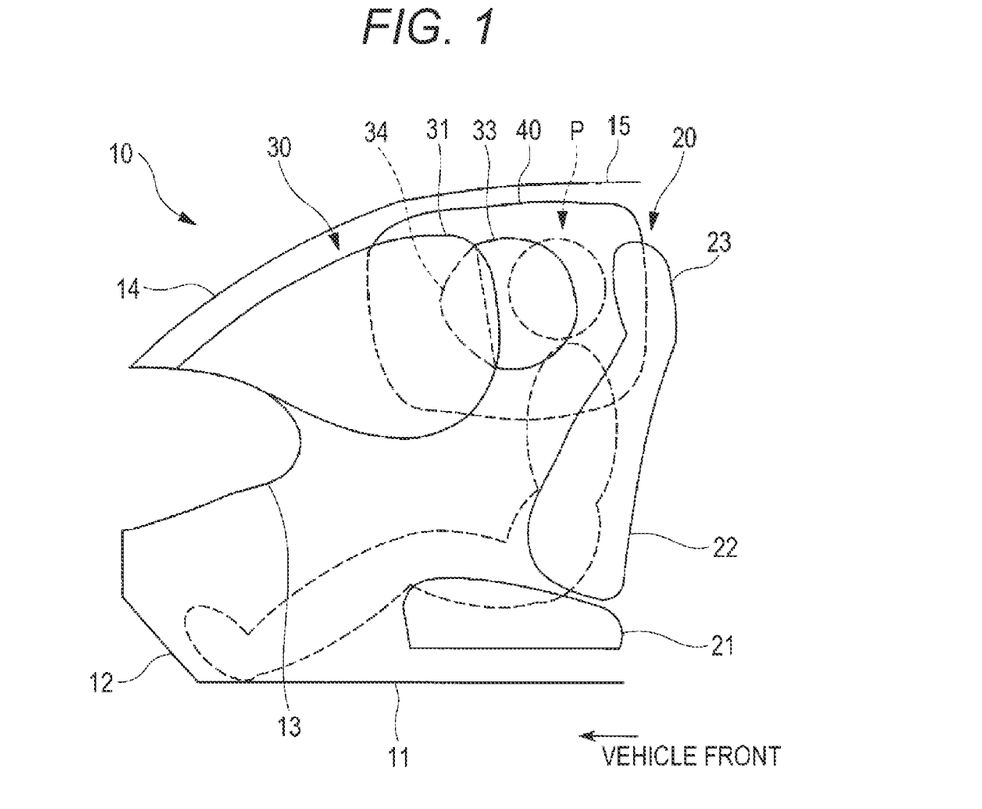
FIG. 1 is a schematic side view of a cabin of a vehicle including an embodiment of an occupant protection device to which the disclosure is applied.

FIG. 1 is a schematic side view of a cabin of a vehicle including an occupant protection device according to an embodiment.

The cabin 10 includes a floor panel 11, a toe board 12, an instrument panel 13, a windshield 14, a roof 15, and the like.

The floor panel 11 is a floor surface of the cabin 10 and is a flat plate-like part disposed substantially horizontally.

The toe board 12 is a part formed by rising upward from a front end of the floor panel 11.

The toe board 12 is disposed on the front side of the foot of the occupant P.

The instrument panel 13 is an interior member formed to protrude from an upper part of the toe board 12 to the vehicle rear side (cabin side).

The instrument panel 13 houses instruments, an air conditioning ventilator, an infotainment device, and the like (not illustrated).

Further, the instrument panel 13 serves as a base to which a passenger seat airbag 30 described later is attached.

The windshield 14 is a glass provided on a front window through which the occupant P visually recognizes the front side of the vehicle.

The windshield 14 extends upward and obliquely rearward from an upper end (front end) of the instrument panel 13.

The roof 15 is a panel-shaped member constituting an upper surface part (ceiling part) of the cabin 10.

The roof 15 extends from an upper end of the windshield 14 toward the vehicle rear side.

The floor panel 11, the toe board 12, and the roof 15 are configured as, for example, a part of a white body (unequipped vehicle body) of a vehicle by press-molding a metal panel such as a steel plate.

A seat 20 on which the occupant P is seated is provided inside the cabin 10.

The seat 20 is, for example, a passenger seat provided in a non-driver seat (passenger seat) in the foremost row in the cabin 10.

The seat 20 includes a seat cushion 21, a backrest 22, a headrest 23, and the like.

The seat cushion 21 is a part (seat surface part) on which the buttocks and thighs of the occupant P are placed.

The seat cushion 21 is attached to an upper part of the floor panel 11 via a seat rail (not illustrated) or the like.

The backrest 22 is a part that supports a back portion, a waist portion, a shoulder portion, and the like of the occupant P from the rear side.

The backrest 22 protrudes upward from the vicinity of a rear end of the seat cushion 21.

The headrest 23 is a part that supports the head of the occupant P from the rear side.

The headrest 23 protrudes upward from the vicinity of an upper end of the backrest 22.

At the time of collision of the vehicle, one or both of the passenger seat airbag 30 and the curtain airbag 40 are deployed in the cabin 10 in order to restrain the occupant P and suppress injury.

The passenger seat airbag 30 is a first bag that is deployed in front of the occupant P seated on the seat 20 and mainly restrains the occupant P from the front side.

The curtain airbag 40 is a second bag that expands laterally on the outside in the vehicle width direction of the occupant P seated on the seat 20 and prevents the head of the occupant P from directly colliding with the front side window or the pillar.

The passenger seat airbag 30 and the curtain airbag 40 are formed by, for example, stitching, fusing, or the like of base fabric panels made of a woven fabric such as nylon fibers into a bag shape.

As illustrated in FIG. 1, the rear portion of the passenger seat airbag 30 and the front portion of the curtain airbag 40 after deployment are disposed so as to overlap each other when viewed in the vehicle width direction.

In an undeployed state (non-collision state), the passenger seat airbag 30 is housed in a retainer (not illustrated) provided in the instrument panel 13 in a folded state.

In an undeployed state, the curtain airbag 40 is housed inside an interior member (trim) at a side portion of the roof 15 in a folded or rolled state.

Figure 2:
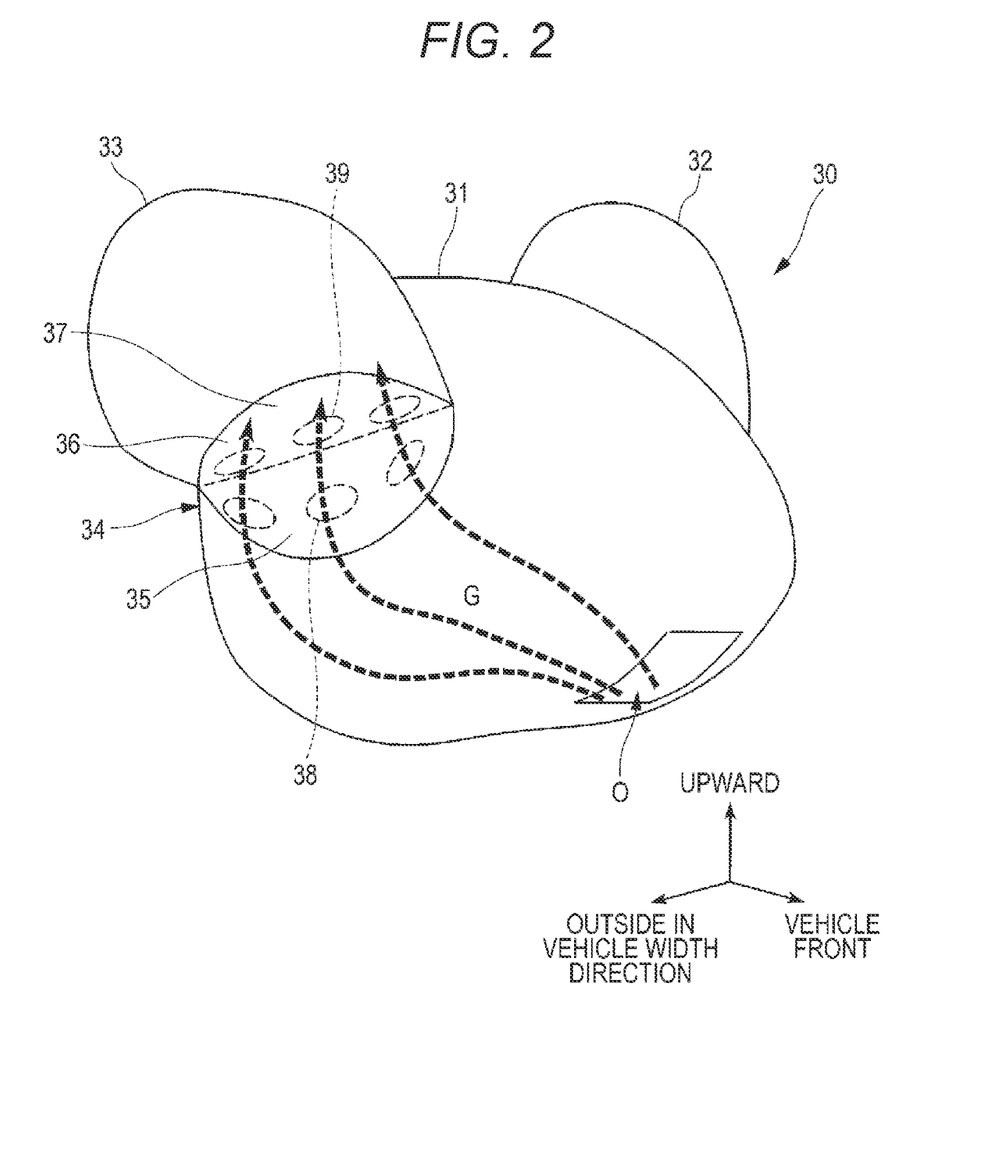
FIG. 2 is an external perspective view of a passenger seat airbag in the occupant protection device according to the embodiment.

FIG. 2 is an external perspective view of a passenger seat airbag in the occupant protection device according to the embodiment.

FIG. 2 illustrates a state in which the passenger seat airbag 30 is viewed from the outside in the vehicle width direction and from the obliquely front side.

The passenger seat airbag 30 includes a main bag 31, an inner support bag 32, an outer support bag 33, an intermediate chamber 34, and the like.

The main bag 31 is a first air chamber that expands in a central portion when the passenger seat airbag 30 is viewed from the occupant P side.

A base end of the main bag 31 is coupled to a retainer provided on the instrument panel 13, and a deployment gas is supplied from an inflator that is a gas generator through an opening O.

The inner support bag 32 and the outer support bag 33 are second air chambers extending from the side portion of the main bag 31 to the vehicle rear side (occupant side) and obliquely outward.

The inner support bag 32 and the outer support bag 33 are side support portions having a function of holding and restraining the head, the upper body, and the like of the occupant P in the vehicle width direction and stabilizing the posture.

The inner support bag 32 and the outer support bag 33 communicate with the main bag 31, and the deployment gas is supplied through the inside of the main bag 31.

The outer support bag 33 communicates with the main bag 31 via the intermediate chamber 34.

The inner support bag 32 is provided on the inner side in the vehicle width direction (the left side in a case of the left-hand drive vehicle illustrated in FIG. 2) with respect to the main bag 31.

The outer support bag 33 is provided on the outside in the vehicle width direction (the right side in the case of the left-hand drive vehicle illustrated in FIG. 2) with respect to the main bag 31.

The intermediate chamber 34 is an air chamber disposed between the main bag 31 and the outer support bag 33.

The intermediate chamber 34 may serve as a communication flow path (third air chamber) for supplying the deployment gas from the main bag 31 to the outer support bag 33.

The intermediate chamber 34 includes a first partition wall 35, a second partition wall 36, and an outer surface part 37.

The first partition wall 35 is a base cloth panel that partitions the main bag 31 and the intermediate chamber 34.

The second partition wall 36 is a base cloth panel that partitions the intermediate chamber 34 and the outer support bag 33.

The first partition wall 35 and the second partition wall 36 may serve as a supply restriction unit that restricts the supply of the deployment gas from the main bag 31 to the outer support bag 33 in response to the interference between the outer support bag 33 and the curtain airbag 40. This point will be described in detail below.

Figure 3A:
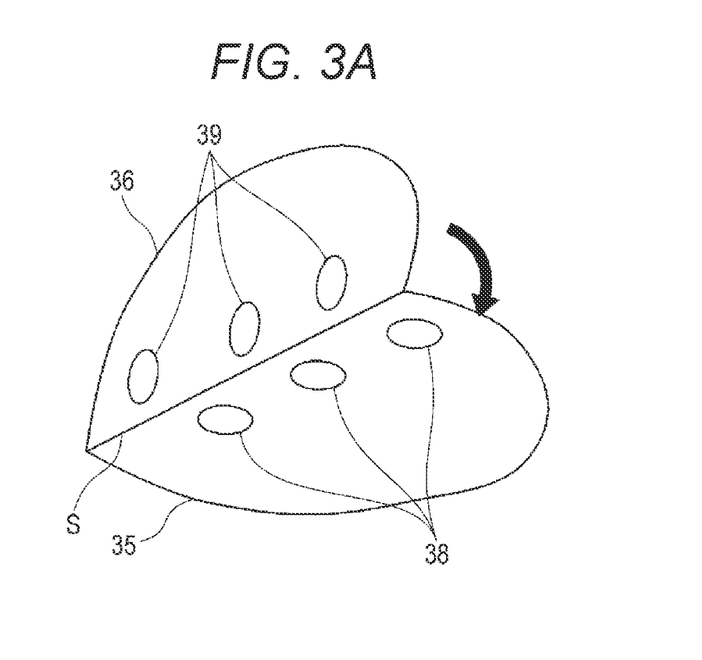
FIGS. 3A and 3B are schematic perspective views illustrating configurations of a first partition wall and a second partition wall of the passenger seat airbag in the embodiment.
Figure 3B:
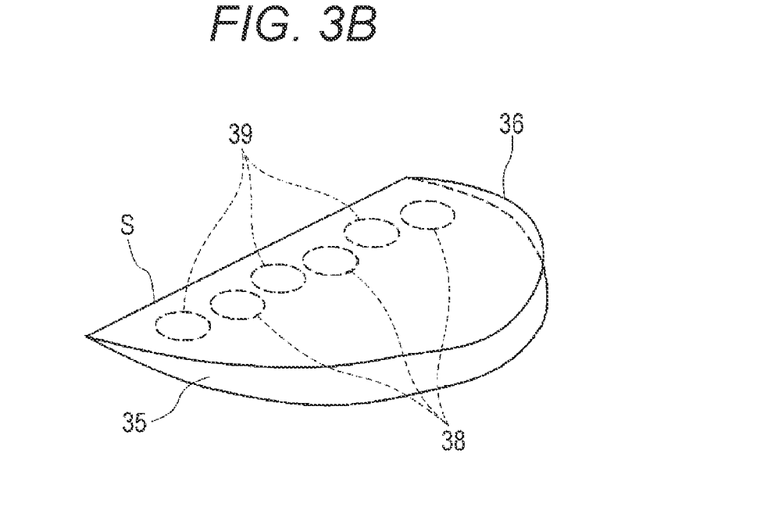

FIGS. 3A and 3B are schematic perspective views illustrating configurations of the first partition wall and the second partition wall of the passenger seat airbag according to the embodiment.

FIG. 3A illustrates a state in which the main bag 31 and the outer support bag 33 communicate with each other via the intermediate chamber 34.

FIG. 3B illustrates a state in which communication between the main bag 31 and the outer support bag 33 is blocked.

The first partition wall 35 and the second partition wall 36 can have a planar shape having a linear side portion S at a part of a peripheral edge, such as a semicircular shape.

The first partition wall 35 and the second partition wall 36 are coupled to each other at the side portion S by, for example, stitching or the like.

Further, peripheral edges of the first partition wall 35 and the second partition wall 36 other than the side portion S are coupled by an outer surface part 37 (not illustrated in FIGS. 3A and 3B. See FIG. 2 and the like).

The outer surface part 37 is a base cloth panel constituting a part of the outer surface of the passenger seat airbag 30.

A joint portion (side portion S) between the first partition wall 35 and the second partition wall 36 is disposed on a center side (main bag 31 side) of the passenger seat airbag 30 in the vehicle width direction.

The outer surface part 37 constitutes an outer surface portion of the intermediate chamber 34 on the outside in the vehicle width direction.

The outer surface part 37 has flexibility, and allows the first partition wall 35 and the second partition wall 36 to be relatively swung around the side portion S to come into and out of contact with each other.

The first partition wall 35 is provided with openings 38.

The openings 38 are vent holes for introducing the deployment gas from the main bag 31 into the intermediate chamber 34.

The openings 38 are, for example, round holes arranged along a direction parallel to the side portion S.

The second partition wall 36 is provided with openings 39.

The opening 39 are vent holes for introducing the deployment gas from the intermediate chamber 34 into the outer support bag 33.

The opening 39 are, for example, round holes arranged along a direction parallel to the side portion S.

As illustrated in FIG. 3A, in a state where the first partition wall 35 and the second partition wall 36 are opened (separated), the openings 38 communicate the main bag 31 and the intermediate chamber 34, and the openings 39 communicate the intermediate chamber 34 and the outer support bag 33.

At this time, the first partition wall 35 and the second partition wall 36 are arranged to face each other at an interval in a load input direction to the outer support bag 33 when the curtain airbag 40 interferes.

In this state, deployment gas G (see FIG. 2) can flow into the outer support bag 33 from the main bag 31 via the inside of the intermediate chamber 34.

As illustrated in FIG. 3B, when the first partition wall 35 and the second partition wall 36 are substantially in close contact with each other, the openings 38 and 39 are arranged to be offset from each other (so as not to overlap each other) when viewed from the normal direction of the first partition wall 35 and the second partition wall 36.

Thus, the openings 38 are closed by the second partition wall 36, and the openings 39 are closed by the first partition wall.

At this time, the supply of the deployment gas from the main bag 31 to the outer support bag 33 via the intermediate chamber 34 is blocked.

In the present embodiment, the above configuration restricts the deployment of the outer support bag 33 when the curtain airbag 40 is deployed. This point will be described in detail later.

Figure 4:
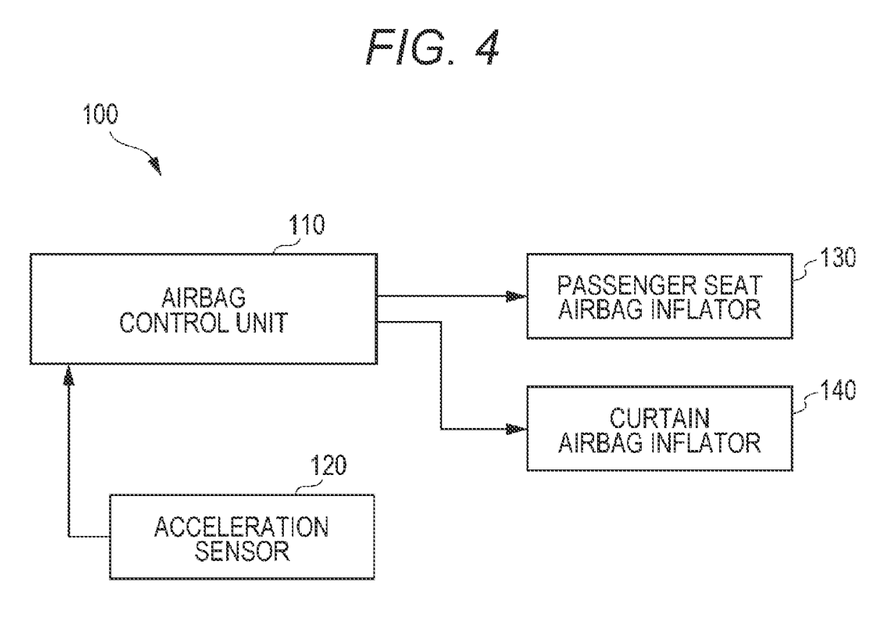
FIG. 4 is a diagram illustrating a system configuration for controlling the occupant protection device according to the embodiment.

FIG. 4 is a diagram illustrating a system configuration for controlling the occupant protection device according to the embodiment.

A control system 100 of the occupant protection device includes an airbag control unit 110, an acceleration sensor 120, a passenger seat airbag inflator 130, a curtain airbag inflator 140, and the like.

The airbag control unit 110 is a control device (deployment controller) that controls deployment of the passenger seat airbag 30 and the curtain airbag 40.

The airbag control unit 110 can be configured as, for example, a microcomputer including an information processing unit such as a CPU, a storage unit such as a RAM and a ROM, an input/output interface, a bus coupling these, and the like.

The airbag control unit 110 is attached to, for example, an upper surface of the floor panel 11 or the like in the cabin 10.

The acceleration sensor 120 detects acceleration in the front-rear direction and the vehicle width direction acting on the vehicle body.

The acceleration sensor 120 can be provided in a housing of the airbag control unit 110 by permanently fixing to the airbag control unit 110, for example.

The airbag control unit 110 detects the occurrence of a collision and determines a collision form based on the output of the acceleration sensor 120.

The passenger seat airbag inflator 130 and the curtain airbag inflator 140 are chemical (gunpowder) gas generators that supply deployment gas to the passenger seat airbag 30 and the curtain airbag 40, respectively.

When the acceleration sensor 120 detects acceleration in a front-rear direction equal to or greater than a predetermined value, the airbag control unit 110 recognizes the occurrence of a frontal collision, and activates the passenger seat airbag inflator 130 to deploy the passenger seat airbag 30.

Further, when the acceleration sensor 120 detects a lateral acceleration equal to or greater than a predetermined value, the airbag control unit 110 activates the curtain airbag inflator 140 to deploy the curtain airbag 40.

Here, for example, in a case of an oblique frontal collision or the like in which another vehicle or the like collides with the vehicle from an oblique front side, the passenger seat airbag 30 and the curtain airbag 40 may be deployed together.

In the embodiment, in such a case, in order to prevent the outer support bag 33 of the passenger seat airbag 30 from interfering with the curtain airbag 40 and the passenger seat airbag 30 from being displaced inward in the vehicle width direction, deployment restriction of the outer support bag 33 using the intermediate chamber 34 is performed as described below.

Figure 5:
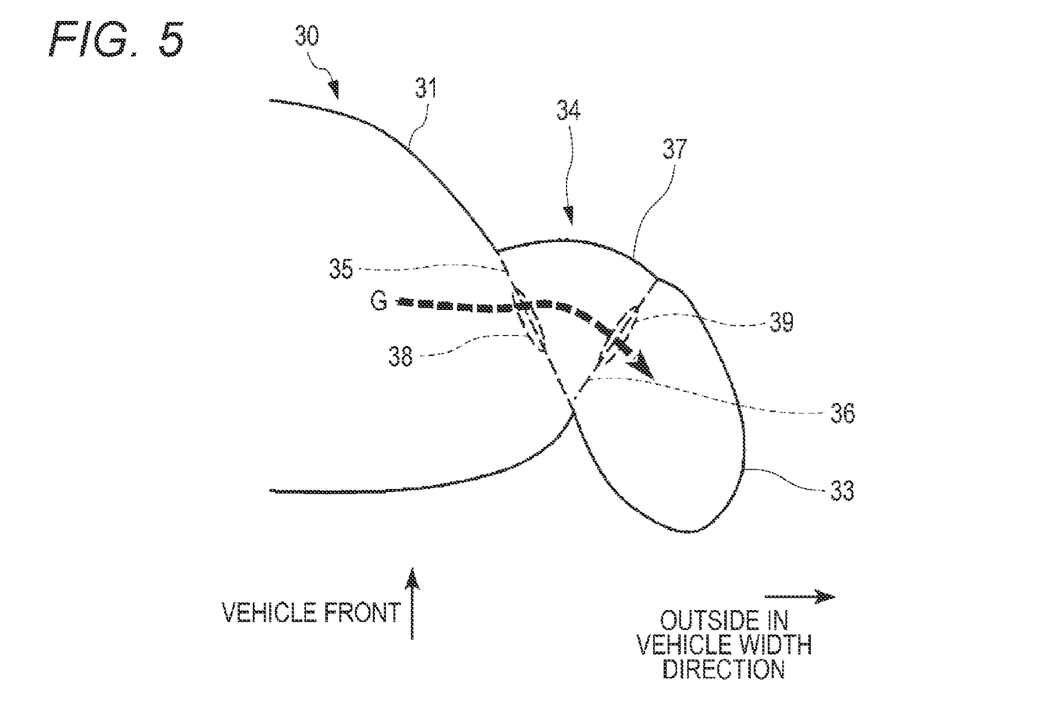
FIG. 5 is a view schematically illustrating a state in which the passenger seat airbag is deployed and a curtain airbag is not deployed in the occupant protection device according to the embodiment.

FIG. 5 is a diagram schematically illustrating a state where the passenger seat airbag is deployed and the curtain airbag is not deployed in the occupant protection device according to the embodiment.

FIG. 5 illustrates, for example, a state at the time of a normal frontal collision in which almost no behavior in the vehicle width direction occurs in the vehicle body.

In the state illustrated in FIG. 5, since the curtain airbag 40 is not deployed, interference between the curtain airbag 40 and the outer support bag 33 does not occur.

In this case, the intermediate chamber 34 is not crushed and the first partition wall 35 and the second partition wall 36 do not come into contact with each other, and the deployment gas G is supplied from the main bag 31 to the outer support bag 33 via the intermediate chamber 34.

Thus, the outer support bag 33 is deployed without being restricted.

Figure 6:
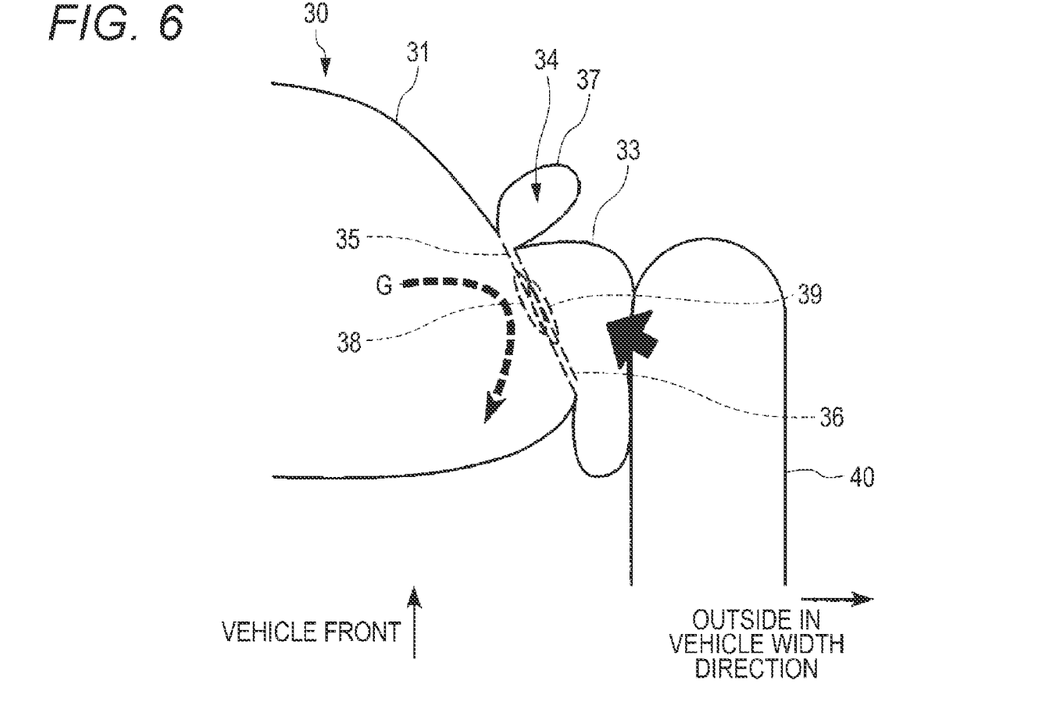
FIG. 6 is a view schematically illustrating a state when both the passenger seat airbag and the curtain airbag are deployed in the occupant protection device according to the embodiment.

FIG. 6 is a view schematically illustrating a state where both the passenger seat airbag and the curtain airbag are deployed in the occupant protection device according to the embodiment.

As illustrated in FIG. 6, when both the passenger seat airbag 30 and the curtain airbag 40 are deployed, the outer support bag 33 at the initial stage of deployment interferes with the curtain airbag 40 and is pressed inward in the vehicle width direction.

Due to the load that the outer support bag 33 receives from the curtain airbag 40, the intermediate chamber 34 is compressed and crushed in a direction in which the first partition wall 35 and the second partition wall 36 come into contact with each other.

When the first partition wall 35 and the second partition wall 36 come into contact with each other, the openings 38 and 39 are closed, so that the supply of the deployment gas G from the main bag 31 to the outer support bag 33 is stopped, and the development of the outer support bag 33 is restricted (further development is stopped).

Thus, interference between the curtain airbag 40 and the outer support bag 33 is suppressed, and the passenger seat airbag 30 is suppressed from being displaced inward in the vehicle width direction by being pushed by the curtain airbag 40.

According to the embodiment described above, the following effects can be obtained.

(1) In a case of a collision mode in which both the passenger seat airbag 30 and the curtain airbag 40 are deployed together, supply of the deployment gas G from the passenger seat airbag 30 to the outer support bag 33 extending toward the curtain airbag 40 is blocked, and the extending amount of the outer support bag 33 from the main bag 31 is restricted, so that deformation and positional displacement of the curtain airbag 40 due to interference between the passenger seat airbag 30 and the curtain airbag 40 can be suppressed, and occupant protection performance can be improved by appropriately restraining the occupant P.

(2) By restricting the supply of the deployment gas G to the outer support bag 33 when the curtain airbag 40 is deployed by closing the openings 38 and 39 formed in the first partition wall 35 and the second partition wall 36, the above-described effect can be obtained with a simple configuration without using a device such as an active vent hole, electronic control, or the like.

(3) The first partition wall 35 and the second partition wall 36 are arranged to face each other at an interval in the load input direction from the curtain airbag 40 to the outer support bag 33, so that the openings 38 and 39 can be appropriately closed in response to interference between the outer support bag 33 of the passenger seat airbag 30 and the curtain airbag 40.

(4) Since the first partition wall 35 and the second partition wall 36 are coupled at the side portion S provided at the peripheral edges thereof, the first partition wall 35 and the second partition wall 36 are relatively swung around the coupling portion, whereby the stability of behavior when the openings 38 and 39 are closed can be enhanced.

Modifications

The present disclosure is not limited to the embodiments described above, and various modifications and changes can be made, which are also within the technical scope of the present disclosure.

For example, the configuration of the occupant protection device is not limited to the configuration according to the above-described embodiment, and can be appropriately changed.

For example, the configuration of the communication flow path for communicating the first air chamber and the second air chamber of the first bag and the configuration of the supply restriction unit for restricting the supply of the deployment gas are not limited to the configuration according to the embodiment, and can be appropriately changed.

In addition, the second bag is not limited to the curtain airbag, and is not particularly limited to, for example, a side airbag or a first-side airbag that deploys inside in the vehicle width direction of the occupant.

In order to solve the above-described problem, an occupant protection device according to an aspect of the disclosure includes a first bag configured to deploy in front of an occupant, a second bag configured to deploy adjacent to the first bag, and a deployment controller configured to select a first deployment mode in which the first bag deploys and the second bag does not deploy and a second deployment mode in which the first bag and the second bag deploy according to a collision mode, in which the first bag includes a first air chamber, a second air chamber that extends from the first air chamber toward the second bag, and a communication flow path configured to supply deployment gas from the first air chamber to the second air chamber, and the communication flow path includes a supply restriction unit configured to restrict supply of the deployment gas from the first air chamber to the second air chamber in response to interference between the second air chamber and the second bag.

With this configuration, in a case of a collision mode in which both the first bag and the second bag are deployed together, supply of the deployment gas from the first bag to the second air chamber extending toward the second bag side is blocked, and the extending amount of the second air chamber from the first air chamber is restricted, so that deformation and positional displacement of the first bag due to interference between the first bag and the second bag can be suppressed, and occupant protection performance can be improved by appropriately restraining the occupant.

In the present disclosure, a configuration can be employed in which the second bag is a curtain bag configured to deploy in a region adjacent to a cabin side surface portion on a side of the first bag, and the second air chamber of the first bag is a side support portion that holds a side portion of a head or an upper body of the occupant.

With this configuration, by suppressing interference with the first bag when the second bag that is a curtain bag is deployed, it is possible to suppress displacement of the first bag inward in the vehicle width direction by being pushed by the curtain bag.

In the disclosure, a configuration can be employed in which the communication flow path includes a third air chamber provided between the first air chamber and the second air chamber, a first partition wall provided between the first air chamber and the third air chamber, a second partition wall provided between the second air chamber and the third air chamber, a first opening provided in the first partition wall, and a second opening provided in the second partition wall, and the first partition wall and the second partition wall come into contact with each other in response to interference between the second air chamber and the second bag, and at least a part of the first opening and the second opening is closed by the first partition wall or the second partition wall.

With this configuration, for example, the above-described effect can be obtained with a simple configuration without using a device such as an active vent hole, electronic control, or the like.

In the disclosure, a configuration can be employed in which the first partition wall and the second partition wall are arranged to face each other at an interval in a load input direction from the second bag to the second air chamber.

With this configuration, the first opening and the second opening can be appropriately closed in response to the interference between the second air chamber of the first bag and the second bag.

In the disclosure, a configuration can be employed in which a part of a peripheral edge of the first partition wall and a part of a peripheral edge of the second partition wall are coupled.

With this configuration, the first partition wall and the second partition wall are relatively swung around the coupling portion, whereby the stability of the behavior when the first opening and the second opening are closed can be enhanced.

As described above, according to the disclosure, it is possible to provide an occupant protection device that suppresses interference between bags and improves occupant protection performance.

The invention claimed is:

1. An occupant protection device for a vehicle, the occupant protection device comprising:
   a first bag configured to deploy in front of an occupant of the vehicle;
   a second bag configured to deploy adjacent to the first bag; and
   a deployment controller configured to select, according to a collision mode, a first deployment mode in which the first bag deploys and the second bag does not deploy and a second deployment mode in which the first bag and the second bag deploy,
   wherein the first bag comprises:
      a first air chamber;
      a second air chamber that extends from the first air chamber toward the second bag; and
      a communication flow path configured to supply deployment gas from the first air chamber to the second air chamber, and
   wherein the communication flow path includes:
      a third air chamber provided between the first air chamber and the second air chamber;
      a first partition wall provided between the first air chamber and the third air chamber:
      a second partition wall provided between the second air chamber and the third air chamber;
      a first opening provided in the first partition wall; and
      a second opening provided in the second partition wall, the second opening being offset from the first opening when viewed from a normal direction of the first partition wall and the second partition wall.

2. The occupant protection device according to claim 1, wherein the second bag is a curtain bag configured to deploy in a region adjacent to a cabin side surface portion on a side of the first bag, and
   wherein the second air chamber of the first bag is a side support portion that holds a side portion of a head or an upper body of the occupant.

3. The occupant protection device according to claim 1, wherein, after deployment, a rear portion of the first bag and a front portion of the second bag are disposed so as to overlap each other when viewed in a vehicle width direction.

4. The occupant protection device according to claim 1, wherein the second air chamber extends from a side portion of the first air chamber to a vehicle rear side and obliquely outward.

5. The occupant protection device according to claim 1, wherein the communication flow path comprises a supply restriction unit configured to restrict supply of the deployment gas from the first air chamber to the second air chamber in response to interference between the second air chamber and the second bag.

6. The occupant protection device according to claim 1, wherein peripheral edges of the first partition wall and the second partition wall are coupled by an outer surface part of the third air chamber.

7. The occupant protection device according to claim 1, wherein the outer surface part has flexibility, and allows the first partition wall and the second partition wall to be swung to come into and out of contact with each other.

8. An occupant protection device for a vehicle, the occupant protection device comprising:
   a first bag configured to deploy in front of an occupant of the vehicle;
   a second bag configured to deploy adjacent to the first bag; and
   a deployment controller configured to select, according to a collision mode, a first deployment mode in which the first bag deploys and the second bag does not deploy and a second deployment mode in which the first bag and the second bag deploy,
   wherein the first bag comprises:
      a first air chamber;
      a second air chamber that extends from the first air chamber toward the second bag; and
      a communication flow path configured to supply deployment gas from the first air chamber to the second air chamber,
   wherein the communication flow path comprises a supply restriction unit configured to restrict supply of the deployment gas from the first air chamber to the second air chamber in response to interference between the second air chamber and the second bag, wherein the communication flow path includes:
- a third air chamber provided between the first air chamber and the second air chamber;
- a first partition wall provided between the first air chamber and the third air chamber;
- a second partition wall provided between the second air chamber and the third air chamber;
- a first opening provided in the first partition wall; and
- a second opening provided in the second partition wall, and wherein, in response to interference between the second air chamber and the second bag, the first partition wall and the second partition wall come into contact with each other, and at least a part of the first opening and the second opening is closed by the first partition wall or the second partition wall.

9. The occupant protection device according to claim 8, wherein the first partition wall and the second partition wall are arranged to face each other at an interval in a load input direction from the second bag to the second air chamber.

10. The occupant protection device according to claim 8, wherein a part of a peripheral edge of the first partition wall and a part of a peripheral edge of the second partition wall are coupled.

11. An occupant protection device for a vehicle, the occupant protection device comprising:
- a first bag configured to deploy in front of an occupant of the vehicle;
- a second bag configured to deploy adjacent to the first bag; and
- a deployment controller configured to select, according to a collision mode, a first deployment mode in which the first bag deploys and the second bag does not deploy and a second deployment mode in which the first bag and the second bag deploy, wherein the first bag comprises:
- a first air chamber;
- a second air chamber that extends from the first air chamber toward the second bag; and
- a communication flow path configured to supply deployment gas from the first air chamber to the second air chamber, wherein the communication flow path comprises a supply restriction unit configured to restrict supply of the deployment gas from the first air chamber to the second air chamber in response to interference between the second air chamber and the second bag, wherein the second bag is a curtain bag configured to deploy in a region adjacent to a cabin side surface portion on a side of the first bag, and wherein the second air chamber of the first bag is a side support portion that holds a side portion of a head or an upper body of the occupant, wherein the communication flow path includes:
- a third air chamber provided between the first air chamber and the second air chamber;
- a first partition wall provided between the first air chamber and the third air chamber;
- a second partition wall provided between the second air chamber and the third air chamber;
- a first opening provided in the first partition wall; and
- a second opening provided in the second partition wall, and wherein, in response to interference between the second air chamber and the second bag, the first partition wall and the second partition wall come into contact with each other, and at least a part of the first opening and the second opening is closed by the first partition wall or the second partition wall.

12. The occupant protection device according to claim 11, wherein the first partition wall and the second partition wall are arranged to face each other at an interval in a load input direction from the second bag to the second air chamber.

13. The occupant protection device according to claim 11, wherein a part of a peripheral edge of the first partition wall and a part of a peripheral edge of the second partition wall are coupled.

* * * * *